(12) United States Patent
Nishide et al.

(10) Patent No.: US 10,612,633 B2
(45) Date of Patent: Apr. 7, 2020

(54) SCREW APPARATUS

(71) Applicant: THK CO.,LTD., Tokyo (JP)

(72) Inventors: Tetsuhiro Nishide, Tokyo (JP);
Masahiko Yoshino, Tokyo (JP);
Toshiaki Shinohara, Tokyo (JP)

(73) Assignee: THK CO., LTD., Tokyo (JP)

( * ) Notice: Subject to any disclaimer, the term of this patent is extended or adjusted under 35 U.S.C. 154(b) by 134 days.

(21) Appl. No.: 15/759,315

(22) PCT Filed: Sep. 27, 2016

(86) PCT No.: PCT/JP2016/078336
§ 371 (c)(1),
(2) Date: Mar. 12, 2018

(87) PCT Pub. No.: WO2017/057306
PCT Pub. Date: Apr. 6, 2017

(65) Prior Publication Data
US 2018/0195591 A1    Jul. 12, 2018

(30) Foreign Application Priority Data
Oct. 1, 2015 (JP) .................................. 2015-195843

(51) Int. Cl.
*F16H 25/24* (2006.01)
*F16J 15/3268* (2016.01)
(Continued)

(52) U.S. Cl.
CPC ..... *F16H 25/2418* (2013.01); *F16H 25/2204* (2013.01); *F16H 57/0497* (2013.01); *F16J 15/18* (2013.01); *F16J 15/3268* (2013.01)

(58) Field of Classification Search
CPC .................................................. F16H 25/2418
See application file for complete search history.

(56) References Cited

U.S. PATENT DOCUMENTS 2,818,745 A * 1/1958 Spontelli ............ F16H 25/2418
74/89.4
4,052,076 A 10/1977 Wysong
(Continued)

FOREIGN PATENT DOCUMENTS

CN 101379321 3/2009
CN 103906948 7/2014
(Continued)

OTHER PUBLICATIONS

International Search Report, dated Dec. 13, 2016, from corresponding PCT/JP2016/078336 application.
(Continued)

*Primary Examiner* — Terence Boes
(74) *Attorney, Agent, or Firm* — Young & Thompson

(57) ABSTRACT

A screw apparatus with a seal ring is provided which has a reduced number of components and is easy to be assembled. The screw apparatus includes a screw shaft, a nut that includes a through-hole penetrated by the screw shaft and threadedly engages with the screw shaft via a rolling element, seal rings that include holes fitting the shape of a cross-section of the screw shaft, the cross-section being perpendicular to an axis thereof, and prevent the entry of dust into the inside of the nut, and/or prevent the leaking of lubricant in the nut, and a cap attached to the nut, the cap including protrusions fitted into indentations of the seal rings to effect positioning of the seal rings in a circumferential direction, the cap including a step in contact with the seal rings to effect positioning of the seal rings in an axial direction.

10 Claims, 6 Drawing Sheets

(51) Int. Cl.
*F16J 15/18* (2006.01)
*F16H 25/22* (2006.01)
*F16H 57/04* (2010.01)

(56) References Cited

U.S. PATENT DOCUMENTS

| | | | | |
|---|---|---|---|---|
| 4,053,167 | A | * 10/1977 | Jelinek | F16H 25/2418 |
| | | | | 277/354 |
| 4,226,431 | A | * 10/1980 | Jelinek | B62D 5/24 |
| | | | | 277/354 |
| 4,407,511 | A | 10/1983 | Benton | |
| 4,795,172 | A | * 1/1989 | Brande | F16H 25/2418 |
| | | | | 277/354 |
| 2002/0062705 | A1 | * 5/2002 | Michioka | F16H 25/2418 |
| | | | | 74/424.82 |
| 2006/0088430 | A1 | * 4/2006 | Sakurai | F16H 25/2418 |
| | | | | 417/572 |
| 2008/0196523 | A1 | * 8/2008 | Liu | F16H 25/2418 |
| | | | | 74/89.4 |
| 2009/0293658 | A1 | 12/2009 | Michioka et al. | |
| 2014/0167363 | A1 | 6/2014 | Oka | |
| 2014/0224051 | A1 | 8/2014 | Kuroiwa et al. | |
| 2014/0352471 | A1 | * 12/2014 | Hsieh | F16H 25/2219 |
| | | | | 74/424.86 |
| 2016/0238114 | A1 | 8/2016 | Oka | |
| 2018/0142767 | A1 | * 5/2018 | Teng | F16H 25/2418 |
| 2019/0063591 | A1 | * 2/2019 | Schmaeling | F16H 25/2252 |

FOREIGN PATENT DOCUMENTS

| | | |
|---|---|---|
| CN | 105658995 | 6/2016 |
| JP | 2000-161462 A | 6/2000 |
| JP | 2007-255661 | 10/2007 |
| JP | 2008-45632 A | 2/2008 |
| JP | 2008-069794 A | 3/2008 |
| JP | 2013-119933 A | 6/2013 |
| JP | 2015-060959 A | 3/2015 |
| TW | 201321629 | 6/2013 |

OTHER PUBLICATIONS

Notification of Reason for Refusal, dated Feb. 13, 2018, from corresponding JP2015-195843 application.
Chinese Office Action for Application No. 201680056674.0, dated Jan. 17, 2019, with English translation provided.
TW Office Action for Application No. 105131598, dated Oct. 12, 2018.

* cited by examiner

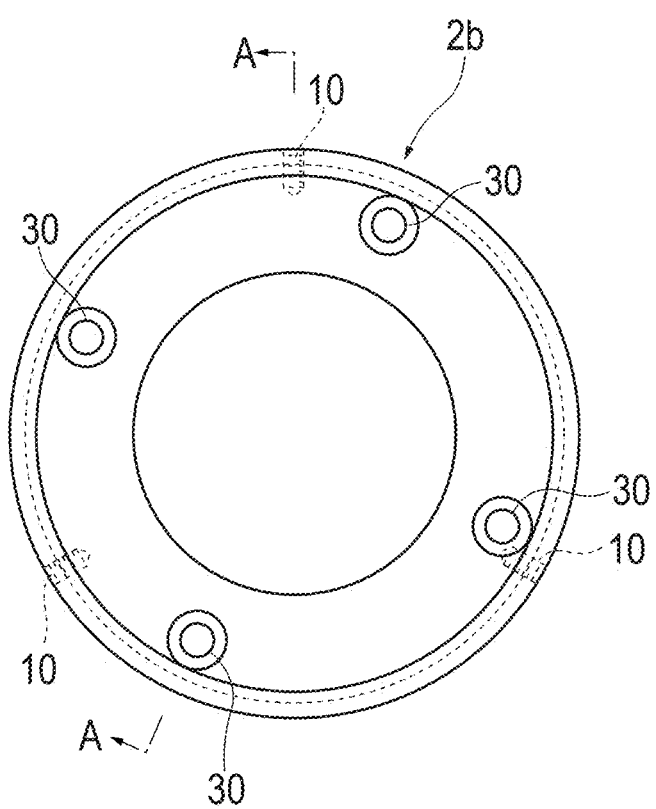
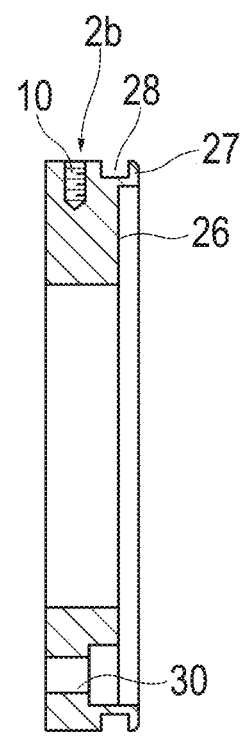
*FIG. 5A*  *FIG. 5B*
A-A CROSS-SECTION

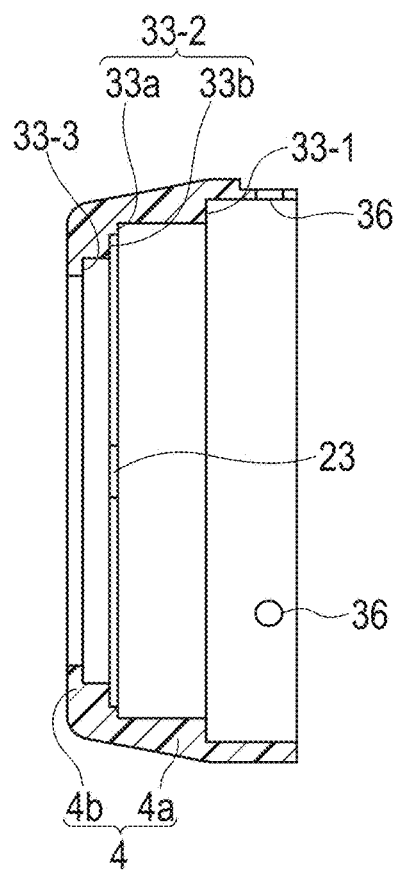
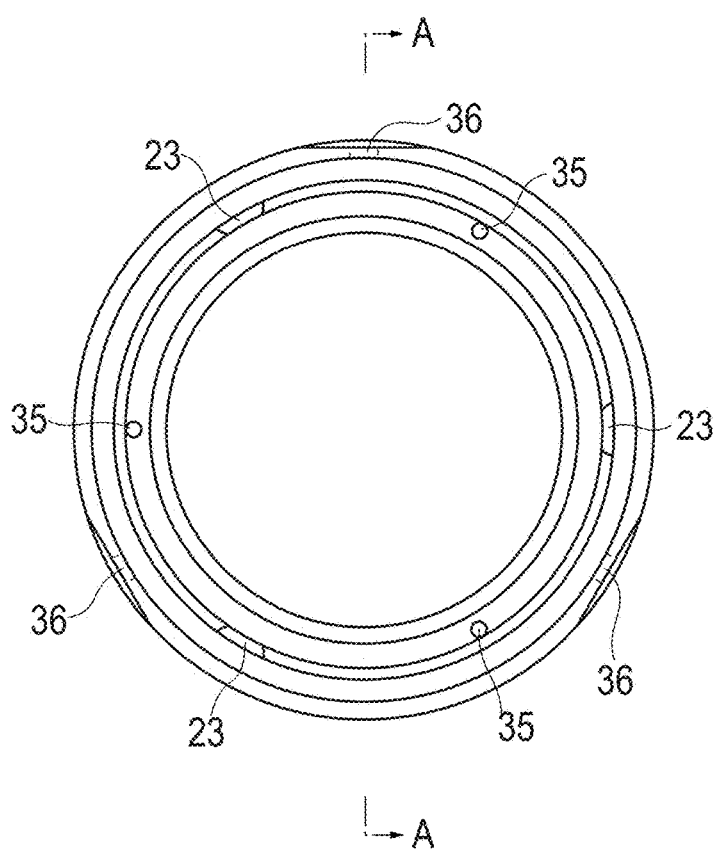
A-A CROSS-SECTION
FIG. 6A
FIG. 6B

SCREW APPARATUS

TECHNICAL FIELD

The present invention relates to a screw apparatus including a seal ring that prevents the entry of dust into the inside of a nut and/or prevents the leaking of lubricant in the nut.

BACKGROUND ART

The screw apparatus includes a screw shaft and a nut that has a through-hole penetrated by the screw shaft and threadedly engages with the screw shaft via a rolling element. When the screw shaft is rotated, the nut moves in an axial direction of the screw shaft. The rolling element is interposed between the screw shaft and the nut. Accordingly, it is possible to eliminate backlash between the screw shaft and the nut and obtain light movement of the screw shaft and the nut.

When dust enters the inside of the nut, the smooth rolling motion of the rolling element is hindered. Hence, a seal ring that prevents the entry of foreign matter into the inside of the nut is attached to the nut. The seal ring has a hole that fits the screw shaft's shape of a cross-section perpendicular to the axis, and prevents the entry of foreign matter into the inside of the nut by bringing an inner periphery of the hole into contact with the screw shaft. A protrusion on the inner periphery of the seal ring is required to be fitted into a helical screw groove of the screw shaft. Accordingly, the seal ring is required to be attached to the nut with the seal ring positioned circumferentially with respect to the nut.

Patent Literature 1 discloses a known screw apparatus including a seal ring, which is configured in such manner as to include through-holes in seal rings and a cap, thread the through-holes with fastening members oriented in an axial direction of a screw shaft, fasten the fastening members to an end surface of a nut, and sandwich the seal rings between the cap and the nut. The screw apparatus described in Patent Literature 1 accurately performs circumferential positioning of the seal rings with respect to the nut by threading the fastening members through cylindrical sleeves and fitting the sleeves into the through-holes of the seal rings without any gaps.

CITATION LIST

Patent Literature

Patent Literature 1: JP 2008-69794 A

SUMMARY OF INVENTION

Technical Problem

However, the screw apparatus described in Patent Literature 1 requires the sleeves to perform positioning of the seal rings. Accordingly, there is an issue that the number of components is high and it is difficult to assemble the screw apparatus.

Hence, an object of the present invention is to provide a screw apparatus with a seal ring, which has a reduced number of components and is easy to be assembled.

Solution to Problem

In order to solve the above issue, an aspect of the present invention is a screw apparatus including: a screw shaft; a nut, including a through-hole penetrated by the screw shaft, to threadedly engage with the screw shaft via a rolling element; a seal ring, including a hole fitting the shape of a cross-section of the screw shaft, the cross-section being perpendicular to an axis thereof, to prevent entry of dust into the inside of the nut, and/or prevent leaking of lubricant in the nut; and a cap attached to the nut, the cap including a protrusion that is fitted into an indentation of the seal ring, or an indentation that is fitted to a protrusion of the seal ring, to effect positioning of the seal ring in a circumferential direction, the cap also including a step in contact with the seal ring to effect positioning of the seal ring in an axial direction.

Advantageous Effects of Invention

According to one aspect of the present invention, positioning of a seal ring can be performed with respect to a nut when a cap is attached to the nut with the seal ring positioned circumferentially and axially in the cap. A sleeve is not required to perform the positioning of the seal ring; accordingly, the number of components can be reduced, and also the assembly of a screw apparatus is easy.

BRIEF DESCRIPTION OF DRAWINGS

FIGS. 5A and 5B are detailed diagrams of a collar of the screw apparatus of the embodiment (FIG. 5A is a front view, and FIG. 5B is an A-A cross-sectional view of FIG. 5A).

FIGS. 6A and 6B are detailed diagrams of the cap of the screw apparatus of the embodiment (FIG. 6A is an A-A cross-sectional view of FIG. 6B, and FIG. 6B is a rear view).

DESCRIPTION OF EMBODIMENTS

A screw apparatus according to one embodiment of the present invention is described in detail hereinafter with reference to the accompanying drawings. However, the screw apparatus of the present invention can be embodied in various modes, and is not limited to the embodiment described in the description. The embodiment is provided with the intention of enabling those skilled in the art to fully understand the scope of the invention by fully disclosing the description.

Figure 1:
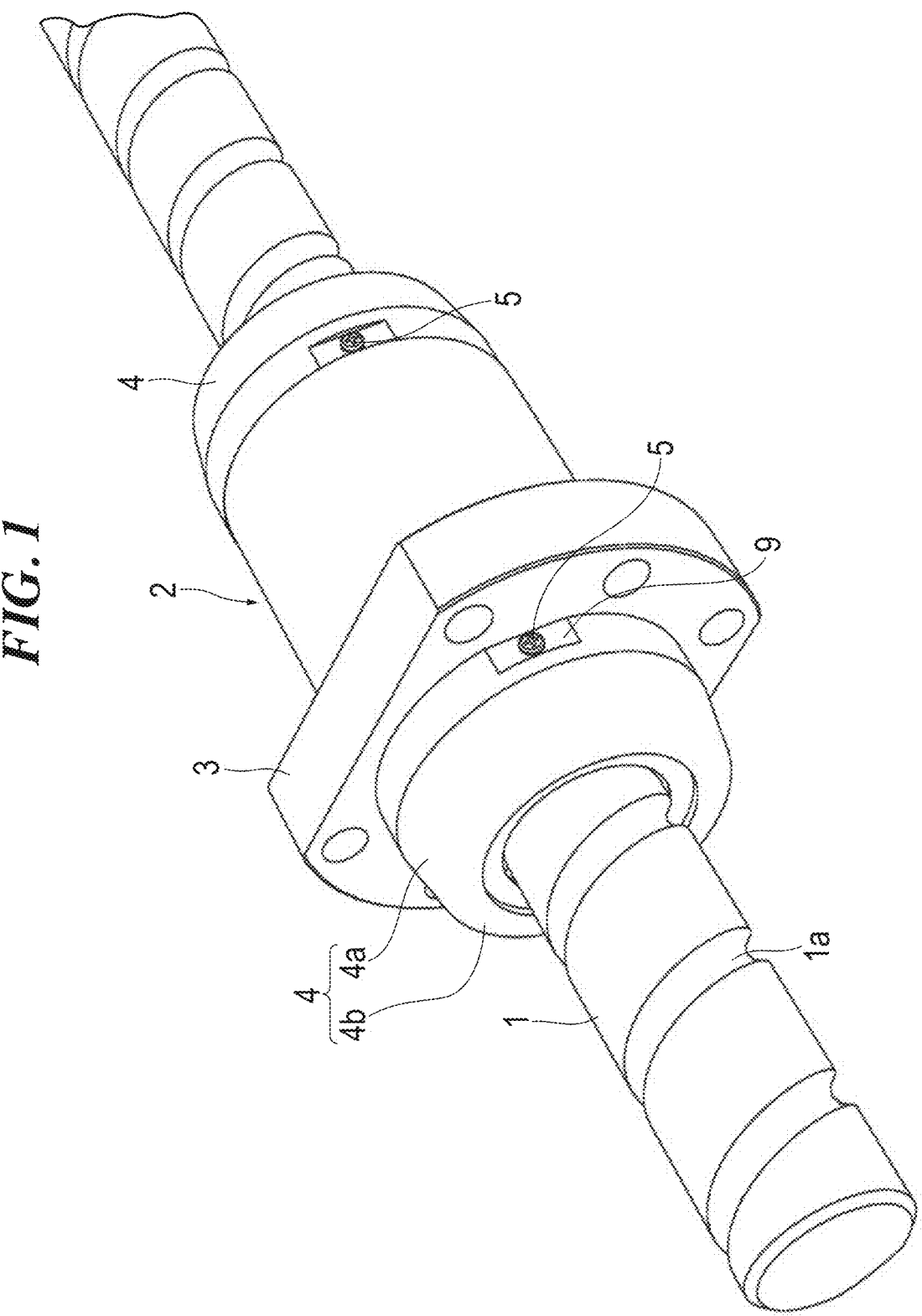
FIG. 1 is an external perspective view of a screw apparatus according to one embodiment of the present invention.
Figure 2:
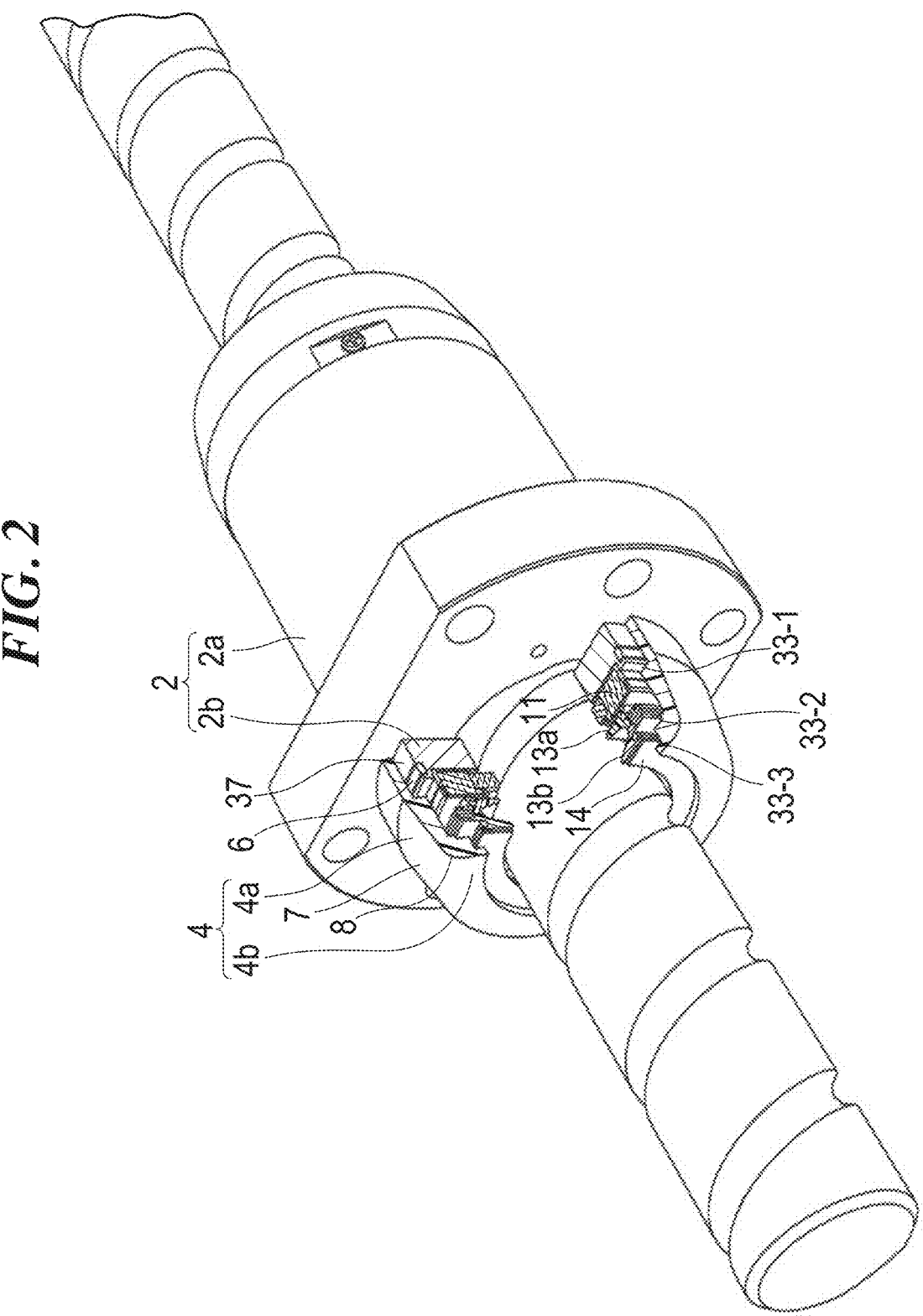
FIG. 2 is a perspective view of the screw apparatus of the embodiment, which represents accessories inside a cap in cross-section.

FIG. 1 illustrates an external perspective view of the screw apparatus of the embodiment. FIG. 2 illustrates a perspective view of the screw apparatus, which represents accessories inside a cap 4 in cross-section.

The screw apparatus includes a screw shaft 1, and a nut 2 that threadedly engages with the screw shaft 1 via a rolling element. The screw shaft 1 has a circular cylinder shape, and includes a helical rolling element rolling groove 1a on an external peripheral surface thereof. The nut 2 includes a through-hole that is penetrated by the screw shaft 1, and is substantially cylindrical. The nut 2 includes a helical rolling element rolling groove facing the rolling element rolling groove 1a of the screw shaft 1 on an inner peripheral surface thereof. A rolling element formed of a sphere is interposed in a manner capable of rolling motion between the rolling element rolling groove 1a of the screw shaft 1 and the rolling element rolling groove of the nut 2. A flange 3 is provided at an end in an axial direction of the nut 2 to attach the nut 2 to a counterpart.

The nut 2 is provided with a circulating component that circulates the rolling element. The circulating component includes, for example, an end piece provided to an end surface in the axial direction of the nut 2, or a return pipe provided to a side surface of the nut 2. The circulating component is publicly known, and accordingly its detailed description is omitted.

A pair of caps 4 is attached to both ends in the axial direction of the nut 2. The configurations of the pair of caps are the same. Accordingly, only the configuration of the cap on the front side in FIG. 1 is described below. The cap 4 is fastened to a side surface of the nut 2 by a plurality of set screws 5 as fastening members oriented in a radial direction. As illustrated in FIG. 2, the nut 2 includes a nut body 2a having the helical rolling element rolling groove, and a collar 2b fixed to the nut body 2a to form a side surface 37 of the nut 2. The cap 4 includes a substantially cylindrical side wall 4a and a substantially annular end wall 4b provided at an end in an axial direction of the side wall 4a. The side wall 4a of the cap 4 is fitted to the collar 2b forming the side surface 37 of the nut 2. The cap 4 is fastened to the collar 2b by the plurality of set screws 5. An O-ring 6 as a resin ring that prevents the entry of dust between the cap 4 and the collar 2b is interposed between the cap 4 and the collar 2b. A taper 7 is provided to an outer peripheral surface of the side wall 4a of the cap 4 to gradually reduce the outside diameter toward the end wall 4b. A chamfer 8 with an arc-shaped cross-section is provided to a connection portion between the outer peripheral surface of the side wall 4a and an outer surface of the end wall 4b.

The plurality of set screws 5 (refer to FIG. 1) is placed, spaced evenly (for example, 120 degrees) in a circumferential direction of the nut 2. In FIG. 1, only one set screw 5 is illustrated. However, three set screws exist in reality. A substantially square flat portion 9 is provided at a position corresponding to the set screw 5 on the outer peripheral surface of the side wall 4a of the cap 4. The flat portion 9 is provided with a through-hole for the set screw 5. The collar 2b is provided with female screws 10 (refer to FIG. 3) that threadedly engage with the set screws 5. The configurations of the cap 4 and the collar 2b are described below. In the embodiment, the set screws 5 are placed, spaced evenly in the circumferential direction, to stably fix the cap 4 to the nut 2. However, the placement is not limited to this, and the set screws 5 may not be placed evenly.

Figure 3:
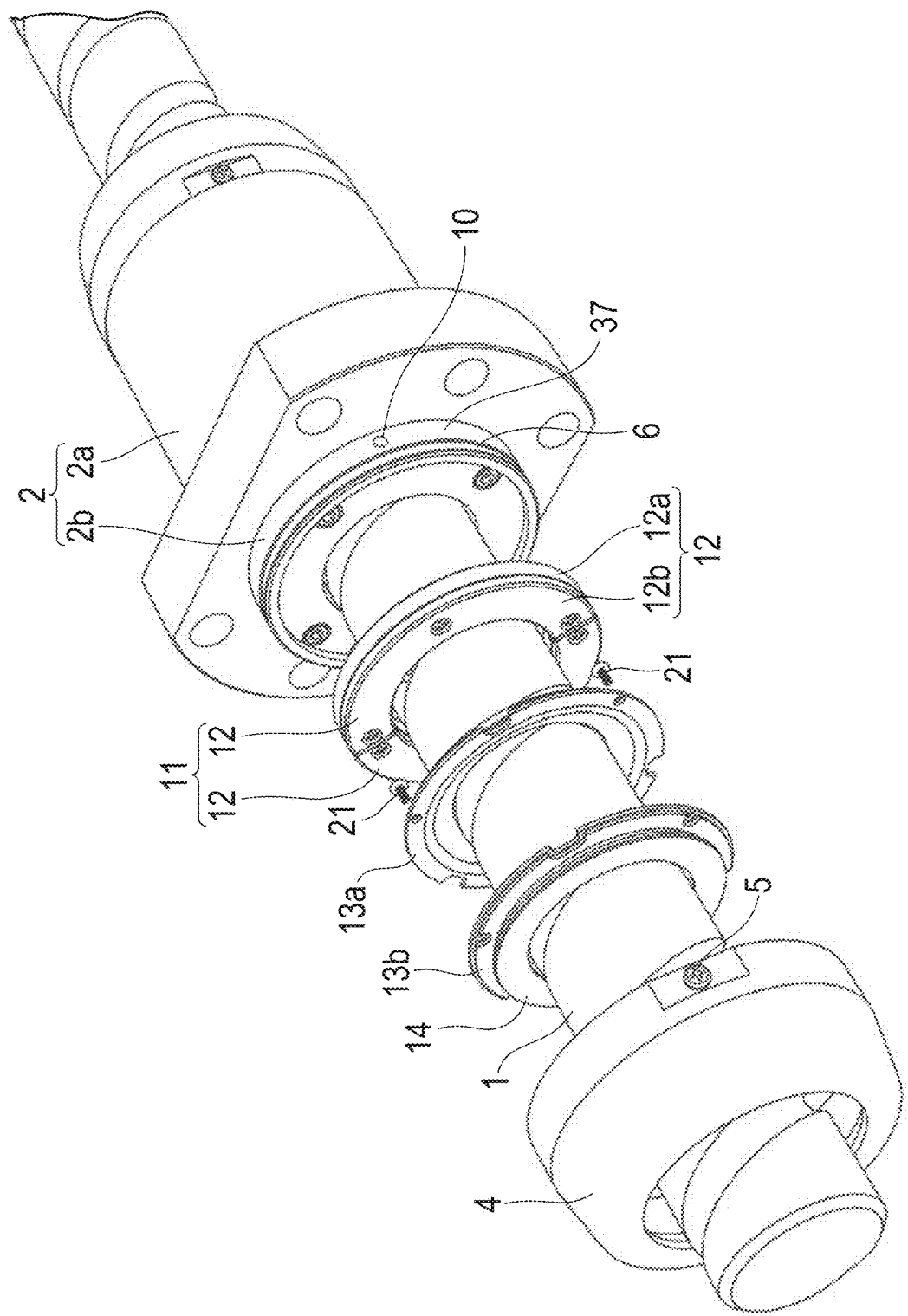
FIG. 3 is an exploded perspective view of the screw apparatus of the embodiment.
Figure 4:
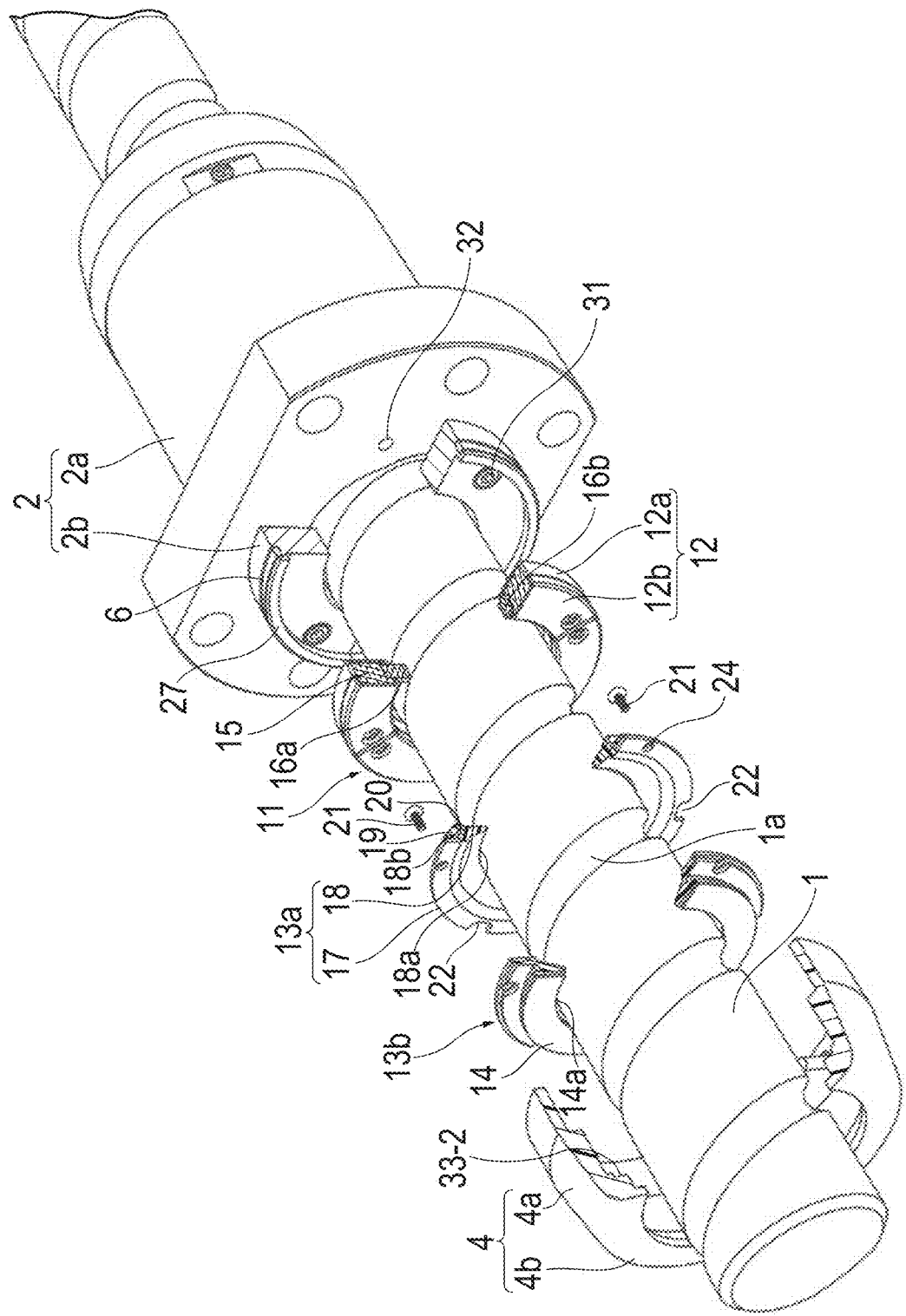
FIG. 4 is an exploded perspective view of the screw apparatus of the embodiment, which represents the accessories in cross-section.

FIG. 3 illustrates an exploded perspective view of the screw apparatus. FIG. 4 illustrates an exploded perspective view of the screw apparatus, which represents accessories in cross-section. A lubricant application device 11, two seal rings 13a and 13b, and a scraper 14, sequentially from the nut 2 side, are housed in the cap 4.

The lubricant application device 11 applies, to the screw shaft 1, lubricant such as lubricating oil or grease. The lubricant application device 11 is ring-shaped, and includes two hemispheres 12 obtained by dividing into two C-shapes. The hemisphere 12 includes a case 12a with an opening and a U-shaped cross-section, and a cover 12b that covers the opening of the case 12a. As illustrated in FIG. 4, a lubricant holding body 15 such as felt that holds the lubricant is housed in the case 12a. A plurality of application bodies 16a and 16b such as felt protrude from an inner periphery of the case 12a, spaced, for example, 90 degrees apart in a circumferential direction of the inner periphery. Proximal ends of the application bodies 16a and 16b are in contact with the lubricant holding body 15. Distal ends of the application bodies 16a and 16b are in contact with the screw shaft 1. The lubricant holding body 15 supplies the lubricant to the application bodies 16a and 16b. The application bodies 16a and 16b apply the lubricant to the screw shaft 1. As illustrated in FIG. 3, the lubricant application device 11 is sandwiched between the seal ring 13a and the collar 2b of the nut 2. The set screws 5 fix the cap 4 to the collar 2b of the nut 2 to fix the lubricant application device 11 to the nut 2. The position of the lubricant application device 11 is not determined in the circumferential direction with respect to the collar 2b of the nut 2, the seal rings 13a and 13b, and the cap 4. The lubricant application device 11 has the property of automatically following the rolling element rolling groove 1a of the screw shaft 1 (self-aligning). Hence, the lubricant application device 11 with the same structure can also be employed for the screw shaft 1 with a different lead.

As illustrated in FIG. 4, the seal ring 13a includes a ring-shaped iron plate portion 17, and a ring-shaped seal portion 18 integral with the iron plate portion 17. The seal ring 13a has a main role in preventing the leaking of the lubricant in the nut 2. The seal portion 18 is an elastic body, and a cross-section thereof has a substantially triangular shape that is pointed toward the screw shaft 1. A hole 18a of the seal portion 18 has a shape fitting the screw shaft 1's shape of a cross-section perpendicular to the axis in such a manner that an inner periphery of the seal portion 18 is in contact with the screw shaft 1. The screw shaft 1 is provided with the rolling element rolling groove 1a. Accordingly, the screw shaft 1's shape of a cross-section perpendicular to the axis is an oddly-shaped circle. The hole 18a of the seal portion 18 is also an oddly-shaped circle. An outer periphery of the seal portion 18 is provided with a groove 19 extending in a circumferential direction thereof. A ring-shaped spring 20 that biases the seal portion 18 toward the screw shaft 1 is placed in the groove 19. The seal portion 18 is provided with a flange-shaped extension portion 18b to increase adhesion to the iron plate portion 17.

A plurality of set screws 21 as fastening members oriented in the axial direction fasten the seal ring 13a to the end wall 4b of the cap 4 from the inside of the cap 4. A plurality of notches 22 as indentations that effect positioning of the seal ring 13a in the circumferential direction with respect to the cap 4 is provided to an outer edge of the iron plate portion 17 of the seal ring 13a. The plurality of notches 22 is provided, spaced evenly (for example, spaced 120 degrees apart) in the circumferential direction. When the notch 22 is fitted to a protrusion 23 (refer to FIGS. 6A and 6B) provided to the cap 4, the seal ring 13a becomes impossible to move in the circumferential direction with respect to the cap 4. Instead of the notch 22, a hole can also be used as the indentation. In the embodiment, the notches 22 are placed in the iron plate portion 17, spaced evenly in the circumferential direction. However, the placement is not limited to this. The notches 22 may not be placed evenly, and the number of the notches 22 may be more than one, or one. If the notches 22 are not placed evenly, or if the number of the notches 22 is one, the position of the seal ring 13a in the circumferential direction can be uniquely determined.

The iron plate portion 17 is provided with through-holes 24 which the set screws 21 thread, out of phase with the notches 22. A plurality of the through-holes 24 is provided, spaced evenly (for example, spaced 120 degrees apart) in the circumferential direction. In the embodiment, the through-holes 24 are placed in the iron plate portion 17, spaced evenly in the circumferential direction. However, the placement is not limited to this. The through-holes 24 may not be placed evenly.

The configuration of the seal ring 13b is the same as that of the seal ring 13a. The seal rings 13b and 13a are arranged back-to-back in such a manner as that the iron plate portions 17 are in contact with each other. The seal ring 13b has a main role in preventing the entry of foreign matter into the inside of the nut 2.

The scraper 14 is formed of a metal annular thin plate. The scraper 14 includes a hole 14a that is penetrated by the screw shaft 1, and is not in contact with the screw shaft 1. The outside diameter of the scraper 14 is smaller than that of the seal ring 13b. The scraper 14 prevents the entry of large foreign matter such as spatters adhered to the screw shaft 1 into the inside of the nut 2. The scraper 14 is not provided with through-holes which the set screws 21 thread. The scraper 14 is sandwiched between the seal ring 13b and the end wall 4b of the cap 4. The set screws 21 fix the seal rings 13a and 13b to the cap 4 to fix the scraper 14 to the cap 4.

FIGS. 5A and 5B illustrate detailed diagrams of the collar 2b. The collar 2b has a substantially short cylindrical shape, and is made of metal such as iron. A ring-shaped protrusion 27 is provided on an end surface on the lubricant application device 11 side of the collar 2b. The lubricant application device 11 is fitted to the inside of the protrusion 27 (refer to FIG. 4). A groove 28 extending in the circumferential direction is provided on an outer peripheral surface of the collar 2b. The O-ring 6 (refer to FIG. 4) is fitted into the groove 28. The female screws 10 that threadedly engage with the set screws 5 are provided on the outer peripheral surface of the collar 2b, spaced evenly (for example, spaced 120 degrees apart) in the circumferential direction. Through-holes 30 formed of countersunk holes penetrating the collar 2b in the axial direction are provided in an end surface 26 on the lubricant application device 11 side of the collar 2b. A plurality of the through-holes 30 is provided, spaced evenly (for example, spaced 90 degrees apart) in the circumferential direction. Female screws 32 that threadedly engage with set screws 31 are provided, at positions corresponding to the through-holes 30, on an end surface of the nut body 2a (refer to FIG. 4). The set screws 31 fasten the collar 2b to the nut body 2a. In the embodiment, the female screws 10 and the through-holes 30 are placed in the collar 2b, spaced evenly in the circumferential direction. However, the placement is not limited to this. The female screws 10 and the through-holes 30 may not be placed evenly.

FIGS. 6A and 6B illustrate detailed diagrams of the cap 4. As described above, the cap 4 includes the substantially cylindrical side wall 4a, and the substantially annular end wall 4b provided at an end in the axial direction of the side wall 4a. Mainly three steps 33-1, 33-2, and 33-3 are provided on an inner peripheral surface of the side wall 4a of the cap 4. The collar 2b is housed in the first step 33-1 on the nut 2 side of the cap 4, and is in contact with the first step 33-1 (refer to FIG. 2). The two seal rings 13a and 13b and the lubricant application device 11 are housed in the second step 33-2 of the cap 4. The seal ring 13b is in contact with the second step 33-2 (refer to FIG. 2). The second step 33-2 includes a large-diameter step portion 33a in contact with the iron plate portion 17 of the seal ring 13b, and a small-diameter step portion 33b in contact with the seal portion 18 of the seal ring 13b. The scraper 14 is housed in the third step 33-3 of the cap 4, and is in contact with the third step 33-3 (refer to FIG. 2).

The protrusions 23 that are fitted into the notches 22 of the seal rings 13a and 13b are provided to the second step 33-2 of the cap 4. The protrusions 23 are fitted into the notches 22 of the seal rings 13a and 13b to effect positioning of the seal rings 13a and 13b in the circumferential direction with respect to the cap 4. Moreover, the seal rings 13a and 13b are brought into contact with the second step 33-2 of the cap 4 to effect positioning of the seal rings 13a and 13b in the axial direction with respect to the cap 4. In this manner, the seal rings 13a and 13b are fixed to the cap 4 with the seal rings 13a and 13b positioned in the circumferential and axial directions with respect to the cap 4. A plurality of female screws 35 that engage with the set screws 21 (refer to FIG. 4) is provided to the second step 33-2 of the cap 4, spaced evenly (for example, spaced 120 degrees apart) in the circumferential direction. The set screws 21 fix the seal rings 13a and 13b to the end wall 4b of the cap 4. As illustrated in FIG. 2, the scraper 14 is sandwiched between the seal ring 13b and the third step 33-3 of the cap 4. The seal rings 13a and 13b are fixed to the cap 4 to fix the scraper 14 to the cap 4. In the embodiment, the female screws 35 are placed in the cap 4, spaced evenly in the circumferential direction. However, the placement is not limited to this. The female screws 35 may not be placed evenly.

As illustrated in FIGS. 6A and 6B, a plurality of through-holes 36 is provided in the side wall 4a of the cap 4, spaced evenly (for example, spaced 120 degrees apart) in the circumferential direction. The through-holes 36 penetrate the side wall 4a of the cap 4 in the radial direction. The set screws 5 (refer to FIG. 3) are threaded through the through-holes 36 to threadedly engage the set screws 5 with the female screws 10 of the collar 2b. Accordingly, the cap 4 is attached to the collar 2b. The seal rings 13a and 13b are fixed in advance to the cap 4. The cap 4 is attached to the collar 2b to fix the lubricant application device 11 between the seal rings 13a and 13b and the collar 2b. In the embodiment, the through-holes 36 are placed, spaced evenly in the circumferential direction. However, the placement is not limited to this. The through-holes 36 may not be placed evenly.

The screw apparatus of the embodiment exerts the following effects:

The cap 4 is attached to the nut 2 with the seal rings 13a and 13b positioned in the circumferential and axial directions in the cap 4, and accordingly, it effects positioning of the seal rings 13a and 13b with respect to the nut 2. A sleeve is not required to perform positioning of the seal rings 13a and 13b. Accordingly, the number of components can be reduced, and also the assembly of the screw apparatus is easy.

The set screws 5 oriented in the radial direction of the screw shaft 1 fasten the cap 4 to the side surface 37 of the nut 2. Accordingly, a set screw oriented in the axial direction of the screw shaft 1 is not required to fasten the cap 4 to the nut 2, which eliminates the possibility that the head of the set screw protrudes in the axial direction from the cap 4. Hence, the appearance of the screw apparatus is improved, and the stroke of the nut 2 in the axial direction can also be increased.

The set screws 21 oriented in the axial direction of the screw shaft 1 fix the seal rings 13a and 13b to the end wall 4b of the cap 4. Accordingly, it is easy to fix the seal rings 13a and 13b to the cap 4.

The scraper 14 is sandwiched between the seal rings 13a and 13b and the cap 4. Accordingly, it is easy to fix the scraper 14 to the cap 4.

The lubricant application device 11 is sandwiched between the seal rings 13a and 13b and the nut 2. Accordingly, it is easy to fix the lubricant application device 11 to the nut 2. Moreover, a through-hole through which a set screw is threaded is not provided to the lubricant application device 11. Accordingly, the lubricant storage amount can be increased.

The O-ring 6 is interposed between the side surface 37 of the nut 2 and the side wall 4a of the cap 4. Accordingly, it is possible to prevent the entry of dust between the side surface 37 and the side wall 4a.

The nut 2 is configured including the nut body 2a having the rolling element rolling groove, and the collar 2b attached to the nut body 2a. Accordingly, it is easy to fix the cap 4 to the nut 2. Moreover, it is also possible to attach the cap 4 to a screw apparatus that is provided at an end in the axial direction of the nut body 2a with an end piece as a circulating component.

The present invention can be modified in various manners within the scope that does not change the gist of the present invention without being limited to the embodiment. For example, the configurations of the cap, the seal rings, the scraper, the lubricant application device, and the collar of the embodiment are examples, and can be changed to other configurations within the scope that does not change the gist of the present invention.

In the embodiment, in order to perform positioning of the seal rings in the circumferential direction with respect to the cap, the protrusions are provided to the cap, and the indentations that are fitted to the protrusions are provided to the seal rings. However, it is also possible to provide the seal rings with protrusions, and provide the cap with indentations that are fitted to the protrusions.

In the embodiment, the collar and the nut body are separate bodies, and the collar is fixed to the nut body. However, it is also possible to integrate the collar and the nut body.

In the embodiment, the positioning of the lubricant application device is not performed in the circumferential direction with respect to the collar. However, the protrusion and indentation provided to the collar and the lubricant application device can also effect the positioning of the lubricant application device in the circumferential direction with respect to the collar.

The description is based on Japanese Patent Application No. 2015-195843 filed on Oct. 1, 2015, the entire contents of which are incorporated herein.

REFERENCE SIGNS LIST

1 Screw shaft
1a Rolling element rolling groove
2 Nut
2a Nut body
2b Collar
4 Cap
4a Side wall
4b End wall
5 Cap-specific set screw (fastening member oriented in the radial direction of the screw shaft)
6 O-ring (resin ring)
11 Lubricant application device
13a, 13b Seal ring
18a Hole of the seal ring
14 Scraper
14a Hole of the scraper
21 Seal ring-specific set screw (fastening member oriented in the axial direction of the screw shaft)
22 Notch (indentation)
23 Protrusion
33-1 First step
33-2 Second step (step)
33-3 Third step
37 Side surface of the nut

The invention claimed is:

1. A screw apparatus comprising:
a screw shaft;
a nut, including a through-hole penetrated by the screw shaft, to threadedly engage with the screw shaft via a rolling element;
a seal ring, including a hole fitting the shape of a cross-section of the screw shaft, the cross-section being perpendicular to an axis thereof, to prevent entry of dust into the inside of the nut, and/or prevent leaking of lubricant in the nut; and
a cap attached to the nut, the cap including a protrusion that is fitted into an indentation of the seal ring, or an indentation that is fitted to a protrusion of the seal ring, to effect positioning of the seal ring in a circumferential direction, the cap being in contact with the seal ring to effect positioning of the seal ring in an axial direction, wherein
the seal ring includes an iron plate portion, and a seal portion which is an elastic body and integral with the iron plate portion, and
the iron plate portion is provided with the indentation or the protrusion of the seal ring, and is provided with a through-hole for a fastening member which fastens the seal ring to the cap.

2. The screw apparatus according to claim 1, wherein the cap is fastened to a side surface of the nut by a fastening member oriented in a radial direction of the screw shaft.

3. The screw apparatus according to claim 2, wherein the seal ring is fastened to an end wall of the cap by the fastening member oriented in an axial direction of the screw shaft.

4. The screw apparatus according to claim 3, further comprising a scraper sandwiched between the seal ring and the cap in non-contact with the screw shaft, the scraper including a hole through which the screw shaft is threaded.

5. A screw apparatus comprising:
a screw shaft;
a nut, including a through-hole penetrated by the screw shaft, to threadedly engage with the screw shaft via a rolling element;
a seal ring, including a hole fitting the shape of a cross-section of the screw shaft, the cross-section being perpendicular to an axis thereof, to prevent entry of dust into the inside of the nut, and/or prevent leaking of lubricant in the nut;
a cap attached to the nut, the cap including a protrusion that is fitted into an indentation of the seal ring, or an indentation that is fitted to a protrusion of the seal ring, to effect positioning of the seal ring in a circumferential direction, the cap being in contact with the seal ring to effect positioning of the seal ring in an axial direction; and
a lubricant application device sandwiched between the seal ring and the nut to apply lubricant to the screw shaft, wherein
the nut includes a nut body having a helical rolling element rolling groove along which the rolling element performs rolling motion, and a collar fixed to the nut body, and to which the cap is attached, the collar is housed in a first step on the nut side of the cap, and the seal ring and the lubricant application device are housed in a second step of the cap, the second step having a smaller diameter than a diameter of the first step.

6. The screw apparatus according to claim 1, further comprising a resin ring configured to prevent entry of dust between the nut and the cap interposed between the nut and the cap.

7. The screw apparatus according to claim 2, further comprising a resin ring configured to prevent entry of dust between the nut and the cap interposed between the nut and the cap.

8. The screw apparatus according to claim 3, further comprising a resin ring configured to prevent entry of dust between the nut and the cap interposed between the nut and the cap.

9. The screw apparatus according to claim 4, further comprising a resin ring configured to prevent entry of dust between the nut and the cap interposed between the nut and the cap.

10. The screw apparatus according to claim 5, further comprising a resin ring configured to prevent entry of dust between the nut and the cap interposed between the nut and the cap.

* * * * *